United States Patent [19]

Speranza et al.

[11] Patent Number: 4,940,770
[45] Date of Patent: Jul. 10, 1990

[54] NOVEL COMPOSITIONS FROM POLYOXYALKYLENE AMINES AND EPOXIDES

[75] Inventors: George P. Speranza, Austin; Jiang-Jen Lin, Houston, both of Tex.

[73] Assignee: Texaco Chemical Co., White Plains, N.Y.

[21] Appl. No.: 270,897

[22] Filed: Nov. 14, 1988

[51] Int. Cl.$^5$ .................. C08G 18/32; C08G 59/14
[52] U.S. Cl. ...................... 528/111; 564/325; 528/407; 528/79
[58] Field of Search .............. 528/111; 564/325

[56] References Cited

U.S. PATENT DOCUMENTS

| | | | |
|---|---|---|---|
| 3,316,185 | 4/1967 | Reinking | 528/111 |
| 3,380,881 | 4/1968 | Williamson et al. | 528/111 X |
| 3,496,138 | 2/1970 | Sellers et al. | 528/111 |
| 4,423,166 | 12/1983 | Moriarity et al. | 528/111 X |

*Primary Examiner*—Earl Nielsen
*Attorney, Agent, or Firm*—Jack H. Park; Kenneth R. Priem; Cynthia L. Kendrick

[57] ABSTRACT

Disclosed are novel compositions useful in mixed epoxy material synthesis, poly(epoxy)-(urea) synthesis and cases where epoxy curing agents require flexibility which are essentially the reaction products of polyoxyalkylene polyamines and epoxides. Specifically the amine reactants comprise polyoxypropylene triamines, amine terminated alkylene glycols and polyoxypropylene diols, such as those represented by Texaco Chemical Company's JEFFAMINE® T-series, JEFFAMINE® EDR series and JEFFAMINE® D-series amines, respectively. The epoxide component prepolymers essentially comprise Bisphenol A diglycidyl ethers. The ratio of JEFFAMINE® amine to epoxide and the use of acetone are essential to prepare non-gelled products.

8 Claims, No Drawings

NOVEL COMPOSITIONS FROM POLYOXYALKYLENE AMINES AND EPOXIDES

BACKGROUND OF THE INVENTION

1. Technical Field of the Invention

This invention relates to epoxy curing agents and more particularly to polyoxyalkylene amines and the reaction thereof with epoxides in the presence of acetone to form compositions generally useful as epoxy curing agents. Some of these compositions exhibit additional desirable properties.

In one embodiment polyoxypropylene triamines, such as JEFFAMINE ® T-series amines are reacted with epoxides to form light colored, fluid hydroxyhexamines. In another embodiment polyoxyalkylene diamines, such as JEFFAMINE ® D-series and ED-series amines are reacted with epoxides, such as, for example Bisphenol A epoxy resins to form amine terminated, light colored liquids with a wide range of viscosities.

2. Related Art

It is well known that various polyamine compounds are widely used as raw materials for hardening agents of epoxy resins. For these resins, typical examples of useful polyamine compounds are aliphatic amines such as ethylenediamine, diethylenetriamine, triethylenetetramine, tetraethylenepentamine, pentaethylenehexamine, hexamethylenediamine, etc.; aromatic amines such as phenylenediamine, diaminophenylmethane, diaminophenylsulfone, etc.; aliphatic amines having aromatic ring, such as xylylenediamine, etc.; and alicyclic amines such as bisaminomethylcyclohexane, isophoronediamine, etc. These polyamine compounds each has a reactivity of the amino group as the specific feature caused by the active hydrogen and they are used for various purposes. Further, polyamine compounds which have been modified in a manner suitable for the specific polyamine compound have found a variety of uses and the modified compounds are used as hardening agents for epoxy resins.

Adducts from amines and diepoxides have long been used in industry as curing agents for epoxy resins.

It is known from U.S. Pat. No. 3,538,184 (November 1970) that a polyglycidyl ether can be reacted with a hexamethylenediamine to form solvent free liquid adducts of polyepoxides and polyamines which are suitable for use as curing agents for epoxy resins.

In U.S. Pat. No. 3,629,181 there is described a curing agent which comprises the adduct from a polyglycidyl ether of a polyphenyl and a cycloaliphatic or cycloaliphatic-aliphatic di-primary diamine, in which at least one of the primary amino groups is bonded to an endocyclic carbon atom of a cycloaliphatic ring.

In U.S. Pat. No. 3,996,175 there are described moulding materials from epoxide resins based on Bisphenol A or on other bis- or polyphenols and epichlorohydrin which contain aromatic amines as curing agents.

U.S. Pat. No. 4,348,505 discloses the preparation of amine adduct curing agents utilizing epoxides of a functionality greater than two which dramatically enhance the chemical resistance properties of the cured epoxy products over results obtained from either free amines or the conventional amine adducts.

In U.S. Pat. No. 4,540,750 it was disclosed that the preparation of diethyl toluene diamine adduct curing agents with epoxides of a functionality of at least two enhances the performance characteristics of cured epoxy and urethane products.

U.S. Pat. No. 4,578,412 is directed to modified (i.e. extended) amine curing agents which are prepared by dissolving a solid elastomeric polyurethane such as RIM polyurethane in an amine of the type used for curing epoxy resins.

A novel polyamine compound made by reacting m-xylyene diamine and epichlorohydrin in the presence of an alkali which is useful as a hardening agent for epoxy resins is disclosed in U.S. Pat. No. 4,605,765.

There are described in U.S. Pat. No. 4,608,404 compositions which contain specific groups of oligomeric diamine hardeners and epoxy compounds which when combined with structural fibers produce composites which have improved tensile properties, high compressive strengths and improved impact resistance and, in addition, demonstrate low moisture absorption.

In an article titled "High Solids Epoxy/Polyamide Coatings", V. Brytus discusses a new polyamide hardener which overcomes the compatibility problem brought about by reducing the molecular weight of epoxy/polyamidoamine maintenance coatings in an attempt to lower the volatile organic content. See *Journal of Coatings Technology*, Vol. 58, No. 740, September 1986. The polyamide has controlled levels of imidazoline and other constituents having an affinity for the Bisphenol A moiety. A two-step method of producing N,N'-dimethyl diamine compounds for use as epoxide polyaddition compounds is described in U.S. Pat. No. 4,623,746. The resins formed using this compound as a curative can be produced with improved strength, toughness and hot/wet properties.

Wang et al disclose in U.S. Pat. No. 4,636,535 curable compositions comprising epoxide prepolymers and polyamidobenzoates, alone or combined with reinforcements such as graphite fibers.

In U.S. Pat. No. 4,680,341 epoxy resin systems are disclosed which exhibit good tensile properties and good moisture sensitivity which are made by copolymerizing tetraglycidates with a polyamine curing agent.

From the preceding discussion it is apparent that compositions with a variety of properties which are the product of a wide range of amine and epoxide components are useful in the field of epoxy curing resins.

It is believed that a method for extending the molecular weight of certain triamines would provide compositions with a number of uses. Hexamines containing functionalities of hydroxy and Bisphenol A would have particularly desirable characteristics. Further, amine terminated compositions with a wide range of predictable viscosities would have many uses for those skilled in the art of epoxy curing resins.

SUMMARY OF THE INVENTION

This invention provides compositions generally useful as epoxy curing agents formed by the reaction of certain polyoxyalkylene amines and epoxides.

One type of composition is formed by reacting polyoxypropylene triamines, such as the JEFFAMINE ® T-series amines with epoxides to form light colored, fluid hydroxyhexamines.

Light colored liquid compositions with a wide range of viscosities are formed by reacting polyoxyalkylene diamines, such as JEFFAMINE ® D-series and ED-series with epoxides.

DETAILED DESCRIPTION

This invention discloses a novel reaction of amines and diepoxides and is a method for extending the molecular weight of the specified amines.

In the narrower and more preferred practice of this invention epoxy curing materials are prepared by reacting polyoxyalkylene amines in the presence of epoxide compounds.

In the first embodiment a series of hexamines, containing functionalities of hydroxy and Bisphenol A, can be prepared from polyoxypropylene triamines such as JEFFAMINE® T-403, T-3000 or T-5000 and diepoxides according to Equation I:

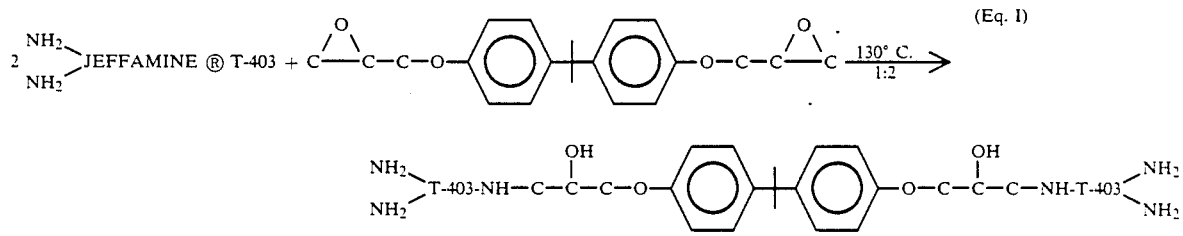

The products are obtained using a molar excess of amine and an acetone solvent (if the molecular weight is below about 1000). The products are useful in areas of mixed epoxy material synthesis as will be demonstrated in the examples.

In another embodiment polyoxyalkylene diamines, such as JEFFAMINE® D-series and ED-series amines are reacted with epoxides, including, but not limited to the diglycidyl ether of Bisphenol A, to form amine terminated, light colored liquids with a wide range of viscosities, depending on the amine used. This can be represented by Equation II:

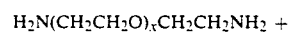

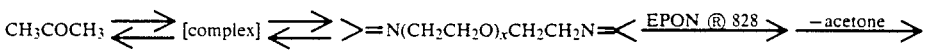

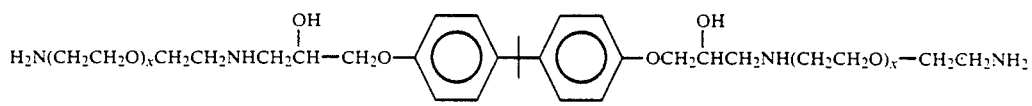

These products are useful for poly(epoxy) and poly(urea) synthesis by using epoxy resins or polyisocyanates.

Finally, in a third embodiment, a synthetic scheme was found suitable for constructing active amine terminated high molecular weight derivatives of Bisphenol A diglycidyl ether from polyoxyalkylene diamines, containing both ethylene oxide and propylene oxide derived amines. This synthetic scheme can be represented by Equation III:

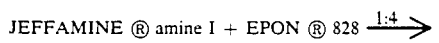

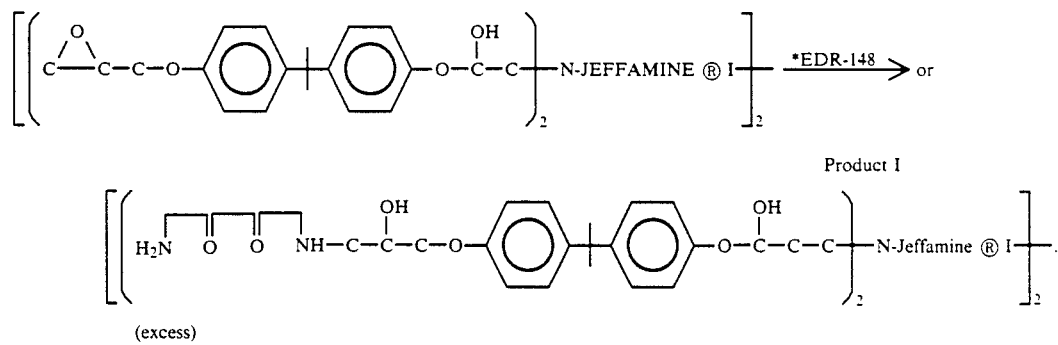

*Triethylene glycol diamine

The product can be used as an epoxy curing agent in cases where flexibility is desirable.

By this two-step synthesis the tailored molecular structure is incorporated into the products which contain active amines as the terminating groups.

The starting materials employed are polyoxyalkylene polyamines, an epoxy material and a solvent.

THE AMINE CURING AGENT

The Polyoxyalkylene Polyamine Component

The polyoxyalkylene polyamine starting materials for the present invention include polyoxypropylene triamines and polyoxyalkylene diamines. The amines may also contain both ethylene oxide and propylene oxide and, preferably, mixtures of from about 5 to about 95 wt % of ethylene oxide with, correspondingly, from about 95 to 5 wt % of propylene oxide. Where mixed propylene oxide/ethylene oxide polyols are employed, the ethylene oxide and propylene oxide may be premixed prior to reaction to form a hetero copolymer, or the ethylene oxide and the propylene oxide may be sequentially added to the ethoxylation kettle to form block oxypropylene/oxyethylene copolymers.

In general, the polyoxyalkylene polyamine starting material may be defined as a polyoxyalkylene polyamine having the formula:

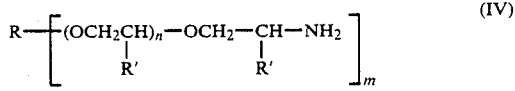

(IV)

wherein R is the nucleus of an oxyalkylation-susceptible polyhydric alcohol containing 2 to 12 carbon atoms and 2 and 3 hydroxyl groups, and R' is hydrogen or methyl, n is a number having an average value of 0 to 100, and m is an integer having a value of 2 to 3.

The first embodiment demonstrates the use of a polyoxypropylene triamine.

In general, the average molecular weight of the polyoxypropylene triamine starting material will be from about 200 to about 5000. An example of appropriate polyoxypropylene triamines that may be used as a starting material for the present invention include triamines sold by Texaco Chemical Company as JEFFAMINE ® T-series products having the formula:

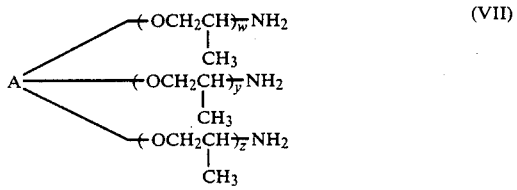

(VII)

wherein A represents the nucleus of an oxyalkylation susceptible trihydric alcohol containing about 3 to about 6 carbon atoms, w, y and z are numbers and the average value of the sum of w+y+z is from about 4 to about 100.

An example of such a product is a commercial product having an average molecular weight of about 400 wherein A represents a trimethylol propane nucleus, and the product contains about 5 to about 6 moles of propylene oxide (JEFFAMINE ® T-403 amine). Another is a product having an average molecular weight of about 5000 wherein A represents a glycerol nucleus and the product contains about 85 moles of propylene oxide (JEFFAMINE ® T-5000).

The second embodiment demonstrates the use of polyoxyalkylene diamines.

One group of appropriate polyoxyalkylene diamines that may be used are those that are sold by the Texaco Chemical Company as JEFFAMINE ® D-series products having the formula:

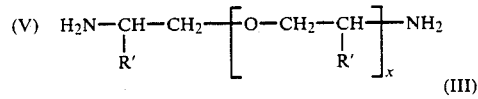

(III)

wherein R' independently represents methyl and x is a number having an average value of about 2 to about 70.

Representative products having this structural formula include polyoxypropylene diamines (wherein R' is methyl) having an average molecular weight of about 230 wherein the value of x is between 2 and 3 (JEFFAMINE ® D-230 amine), polyoxypropylene diamines having an average molecular weight of about 400 wherein x has a value between about 5 and 6 (JEFFAMINE ® D-400 amine), a polyoxypropylene diamine product having an average molecular weight of about 2000 wherein x has a value of about 33 (JEFFAMINE ® D-2000 amine), and a product having an average molecular weight of about 4000 wherein x has a value of about 60 (JEFFAMINE ® D-4005 amine).

Also suitable in the third embodiment are amine terminated polyethylene glycols, such as those marketed by Texaco Chemical Co. under the tradename JEFFAMINE ® EDR-148 AND -192. JEFFAMINE ® EDR-148 is an amine terminated triethylene glycol having the formula:

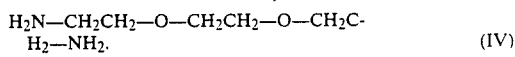

(IV)

JEFFAMINE ® EDR-192 is an amine terminated tetraethylene glycol having the formula:

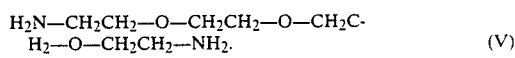

(V)

The Epoxide Material

The epoxy resins which may be used herein contain two or more epoxy groups having the following formula:

The epoxy groups can be terminal epoxy groups or internal epoxy groups. The epoxides are of two general types: polyglycidyl compounds or products derived from epoxidation of dienes or polyenes. Polyglycidyl compounds contain a plurality of 1,2-epoxide groups derived from the reaction of a polyfunctional active hydrogen-containing compound with an excess of an epihalohydrin under basic conditions. When the active hydrogen compound is a polyhydric alcohol or phenol, the resulting epoxide composition contains glycidyl ether groups. A preferred group of polyglycidyl compounds are made via condensation reactions with 2,2-bis(4-hydroxyphenyl)propane, also known as Bisphenol A, and have structures represented by VI,

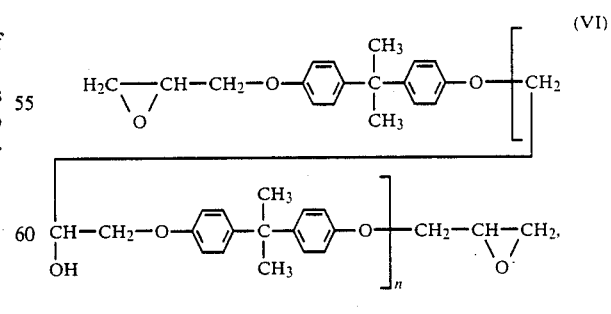

(VI)

where n has a value from about 0 to about 15. These epoxides are Bisphenol A epoxy resins. They are available commercially under tradenames such as "EPON ® 828," "EPON ® 1001" and "EPON ® 1009" from Shell Chemical Co. and as "DER ® 331", "DER ®

332", and "DER ® 334" from Dow Chemical Co. The preferred Bisphenol A epoxy resins have an "n" value between 0 and 10.

The Examples demonstrate the effectiveness of a Bisphenol A epoxy resin of the formula:

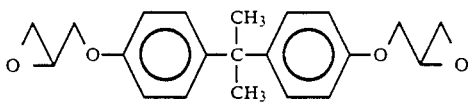

available commercially as DER ® 331 (Dow Chemical) or EPON ® 828 (Shell).

Solvent

The use of a solvent is preferred and was essential in embodiments two and three, represented by Equations II and III, to avoid gel formation. Suitable solvents include ketones and alcohols.

Preferred solvents are ketones. Ketones which are useful include acetone, diethylketone and methyl isobutylketone. The preferred ketone is acetone.

The preferred amount of solvents in the reaction mixture is from 5 to 50%. The ketone solvents are used to avoid gel-formation since the amine-ketone enamine complex tends to retard the reaction rate.

Preparation of Novel Curing Agents

The new adduct curing agents are manufactured according to the invention by reacting a polyoxyalkyleneamine with the Bisphenol A epoxy resin in a ratio of at least 2 to 1 moles of the amine per epoxide group equivalent of the polyglycidyl ether in acetone, with warming to a temperature of from 50° C. to 200° C. and preferably from 80° C. to 150° C. at $N_2$ atmosphere for 0.5 to 8 hours, then cooling to room temperature.

In the third embodiment the molar ratio in the first step needed to be larger than 4:1 of epoxide to amine.

Products

The curing agent formulations manufactured according to the invention show a series of advantages.

The products of the first embodiment provide a method for extending the molecular weight of JEFFAMINE ® T-series amines. They comprised a series of four primary amines and two disecondary amines containing functionalities of hydroxy and Bisphenol A. The products were non-gelled and were light colored fluids.

The products in the second embodiment were novel hydroxy bearing primary and secondary polyamines with the functionality of Bisphenol A. Physically they were viscous, light colored liquids with a wide range of viscosities depending on the JEFFAMINE ® amines used as reactants.

The products in the third embodiment were active amine terminated high molecular weight derivatives of Bisphenol A diglycidyl which appeared as transparent liquids.

The products are useful in areas of mixed epoxy material syntheses, poly(epoxy)-(urea) synthesis and as epoxy curing agents in cases needing flexibility.

Products were identified by several methods. The compositions were evidenced by amine, hydroxy and molecular weight analysis.

To illustrate the process of the invention the following examples are given. Examples 1–7 illustrate the first embodiment, Examples 8–17 the second and 18–26 the third. It is to be understood, however, that the examples are given in the way of illustration and are not regarded as limiting the invention in any way.

Examples 1 and 2 illustrate the reactions involving tri function amines such as JEFFAMINE ® T-series amines, with or without acetone solvent.

EXAMPLE 1

T-5000/EPON ® 828 (2:1) Adduct

To a 500 ml three-necked flask equipped with a thermometer, stirrer and nitrogen inlet line was charged JEFFAMINE ® T-5000 (220 g, ca. 0.040M) and a diglycidyl ether of Bisphenol A (Shell product, EPON ® 828, 7.5 g, ca. 0.02M). The mixture was heated to 120° C. for 4 hours under $N_2$-flow. At room temperature, a yellowish viscous liquid was obtained (225 g). The analyses indicated total amine 0.50 meq/g (calc. 0.53 meq/g), total acetylatable 0.86 meq/g (calc. 0.72 meq/g). The viscosity of this product was 1,800 cs/25° C.

EXAMPLE 2

T-3000/EPON ® 828 (2:1) Adduct

To a 500 ml three-necked flask equipped with a thermometer, stirrer and nitrogen inlet line was charged JEFFAMINE ® T-3000 (150 g, 0.05M) and EPON ® 828 (9.35 g, 0.025M). The mixture was heated to 120°–125° C. for over 3 hours under nitrogen atmosphere. At room temperature, a light-colored viscous liquid was obtained 157 g). The analyses indicated 0.84 meq/g for total amine (0.9 meq/g, calculated), and 122 meq/g for total acetylatable (calc. 1.2 meq/g). The viscosity was 6100 cs/25° C.

EXAMPLE 3

T-403+EPON ® 828 (2:1) Adduct

To a 250 ml three-necked flask equipped with a thermometer, Dean-Stark trap, stirrer and $N_2$ line was charged JEFFAMINE ® T-403 (27.6 g, 0.06M) and EPON ® 828 (11.2 g, 0.03M). The mixture was heated to 125°–130° C. for ca. 3 hours. A viscous nongelled, light colored liquid was obtained (36 g). The analyses indicated total amine 4.65 meq/g and total acetylatable 6.24 meq/g. The viscosity was 6000 cs/25° C.

EXAMPLE 4

T-403+EPON ® 828 (2:1) Adduct

To a 250 ml three-necked flask equipped with a thermometer, Dean-Stark trap, stirrer and $N_2$ line was charged JEFFAMINE ® T-403 (92 g, 0.2M) EPON ® 828 (37 g, 0.1M) and acetone (50 ml). The mixture was heated slowly to remove acetone through a Dean-Stark trap, then to 135° C. for 1 hour and 130° C. under vacuum for another hour. The product was a Viscous, light colored liquid. The analyses were 4.48 meq for total amine (4.6 meq/g) calc.) and 6.0 meq/g for total acetylatable (6.1 meq/g calculated.) The viscosity was 66,000 cs/25° C.

EXAMPLE 5

Attempted Synthesis of T-403 and EPONEX ® 151 (2:1) Adduct

To a 250 ml three-necked flask equipped with a thermometer, stirrer, and nitrogen line was charged JEFFAMINE ® T-403 (92 g, 0.2M) and EPONEX ® 151 (47 g, 0.1M, Shell product, reduced form of EPON ® 828). The mixture was heated to 120°–130° C. for 4 hours. A cross-linked gelled material was obtained.

Examples VI through XV demonstrate the method of the second embodiment.

It is noted that (1) acetone is essential for the process, except in the case of a high molecular weight amine such as D-2000. It is believed other ketones could be used.

(2) The viscosities of various products are generally consistent with molecular weight of amines.

(3) The introduction of Bisphenol A and hydroxy group increases chemical resistance, adhesion, good hardness and other properties in the amine product. It also increases compatibility.

EXAMPLE 6

Products from D-230 and EPON® 828 (2:1 molar ratio)

To a 500 ml three-necked flask equipped with a thermometer, Dean-Stark trap, stirrer and nitrogen inlet line was charged JEFFAMINE® amine D-230 (46 g, 0.2 mole) and acetone (6.0 g, 0.1 mole). The mixture was heated to about 45° C. for 30 minutes. Another solvent, i-propanol (50 ml) was added. Then the mixture of diglycidyl ether of Bisphenol A (or EPON® 828, Shell's product, 37.4 g, 0.1 mole) in ethyl acetate (40 g) was added. The reaction temperature was kept at 70° C. for 1 hr. After the solvent was removed at 90°–100° C. under vacuum a nice looking, homogeneous, colorless, viscous liquid was obtained. There were no signs of gel-formation observed. The mixture was added with 30 ml of water and further stripped at 100°–140° C. under vacuum. The final product (71 g) was a very light yellowish liquid with the following analyses; 4.30 meq/g for total amine (calc. 4.8 meq/g) and 6.9 meq/g total acetylatable (calc. 7.2 meq/g).

EXAMPLE 7

Reaction of EPON® 828 and D-230 (1:2) Without Acetone Protecting Group—Comparative Example To a 500 ml three-necked flask equipped with a thermometer, Dean-Stark trap, stirrer and nitrogen inlet line was charged D-230 (46 g, 0.2 mole) in i-propanol (50 g). At room temperature, the mixture of EPON® 828 (37.4 g) in ethyl acetate was added and then heated to 86° C. for one hour. The material gelled. The gelled material was insoluble in methanol.

Other examples and their analytical results are summarized in Table 1.

TABLE 1

Reactions of JEFFAMINE® Amines and Diglycidyl Ether of Bisphenol A (at 2:1 molar ratio)

| Example | Amines | Amine (Meq/g) | Products Total Acetylatable (meq/g) | Viscosity (cs/50° C.) |
| --- | --- | --- | --- | --- |
| 8 | EDR-148 | 5.8 (6.0)* | 8.6 (9.0)* | 57,000 |
| 9 | EDR-148[1] | 5.8 (6.0)* | — | 62,000 |
| 10 | EDR-192 | 5.2 (5.2)* | 7.9 (7.8)* | 10,000 |
| 11 | D-230 | 4.8 (4.8)* | 7.2 (7.2)* | 25,000 |
| 12 | D-230[2] | 4.3 (4.8)* | 6.9 (7.2)* | — |
| 13 | D-400 | 3.2 (3.4)* | 4.0 (5.1)* | 5,800 |
| 14 | D-2000 | 0.88 (0.90)* | 1.3 (1.4)* | 1,200 |
| 15 | D-2000[3] | 0.88 (0.90)* | 1.6 (1.4)* | 250 |

Note: Acetone was used except:
[1]acetone/H₂O
[2]acetone/i-PrOH
[3]neat
*Theoretical figures

EXAMPLE 16

Usage of Product

The sample of Example 17, a high molecular weight amine, (21.6 g) and EPON® 828 (20 g) was mixed well and poured into a mold and cured at 60° C. for 2 hours to give a flexible, high integrity material.

Other experimental examples are attached.

It is noted that:

(1) In order to avoid gelled product, the proper ratio of amine to epoxy resin is required. The first step required larger than 1:4 molar ratio.

(2) In the second step, due to the tetrafunctionality, an excess of EDR-148 or EDR-192 was needed.

(3) Acetone was essential for preparing these products.

EXAMPLE 17

Products from D-2000-EPON® 828-EDR-148 (1:4:9 molar ratio)

To a 500 ml three-necked flask equipped with a thermometer, stirrer, Dean-Stark trap and N₂ line was charged D-2000 (100 g, 0.05M) and EPON® 828 (74.8G, 0.2 mole) in acetone (50 ml). The mixture was heated to 70°–88° C. to remove acetone over a 1 hour period of time. Then EDR-148 (66.6 g, 0.45 mole) in acetone (30 ml) was added. The final mixture was heated slowly to 120°–130° C. and subjected to vacuum for ca. 1 hour. The resulting product (237 g) was a yellowish-brown liquid having analyses of total amine 4.01 meq/g, total acetylatable 5.32 meq/g and viscosity 5500 cs/50° C.

EXAMPLE 18

Products from D-400-EPON® 828-EDR-148 (1:4.5:10 molar ratio)

To a 500 ml three-necked flask equipped with a thermometer, stirrer, Dean-Stark trap and N₂ line was charged D-400 (20 g, 0.05 mole) in acetone (20 ml) and EPON® 828 (84 g, 0.225 mole) in acetone (80 ml). The mixture was heated slowly to remove acetone over a 2 hour period of time. Then EDR-148 (74 g, 0.5 mole) in acetone (70 ml) was added. The process of removing solvent was repeated. The mixture was heated to 130° C. under reduced pressure. The resulting product (185 g) was a viscous, transparent brown liquid having analyses of 23,000 cs/50° C., total amine content 5.82 meq/g and total acetylatable 7.48 meq/g.

EXAMPLE 19

Products from D-2000-EPON® 828-EDR-192 (1:3:4 molar ratio)

To a 500 ml three-necked flask equipped with a thermometer, stirrer, Dean-Stark trap and N₂ inlet line was charged JEFFAMINE® D-2000 (160 g, 0.08 mole) in acetone (60 g) and EPON® 828 (90 g, 0.24 mole) in acetone (90 g). The mixture was heated to reflux and then to 100° C. Acetone was removed during the process. Then EDR-192 (74 g, 0.385 mole) in acetone (50 ml) and water (50 ml) was added. The process of removing solvents was repeated by heating the mixture to 130° C. for ca. 2 hours. The resulting product was a viscous liquid, having the following analyses: viscosity: 22,000 cs/50° C., total amine 2.79 meq/g and hydroxyl number 5.18 meq/g.

EXAMPLE 20

Products from D-2000-EPON® 828-EDR-192 (1:4.5:5.0 molar ratio)

To a 500 ml three-necked flask equipped with a thermometer, stirrer, Dean-Stark trap and N₂ line was charged D-2000 (100 g, 0.05 mole) and EPON® 828 (84 g, 0.225 mole) in acetone (80 ml). The mixture was heated to the refluxing temperature and acetone was removed. Then EDR-192 (48 g, 0.25 mole) in acetone (50 ml) was added. During the process of removing acetone, gel formation was observed. This experiment defined the limitations of molar ratio of JEFFAMINE® amine(I)-EPON® 828-JEFFAMINE® amine-(II).

It appeared that the molar ratio of amine to epoxide was an important factor for controlling the process and obtaining a non-gelled product.

EXAMPLE 21

Products from D-2000-EPON® 828-EDR-192 (1:2:2 molar ratio)

To a resin flask equipped with a thermometer, Dean-Stark trap, stirrer and N₂ inlet line was charged D-2000 (160 g, 0.08 mole) in acetone (60 g) and EPON® 828 (60 g, 0.16 moles) in acetone (60 g). The mixture was heated to 70°–100° C. for 4 hours while removing acetone through a Dean-Stark trap. Then EDR-192 (31 g, 0.16 moles) in acetone (30 g) and water (15 g) was added. The mixture was heated slowly to 100° C. and then to 130° C. for 4 hours under an aspirator vacuum. The recovered product was a rubbery, brown solid.

EXAMPLE 22

Products from D-2000-EPON® 828-EDR-148 (1:2:2 molar ratio)

To a 500 ml three-necked flask equipped with a thermometer, Dean-Stark trap, mechanical stirrer and nitrogen inlet line was charged JEFFAMINE® D-2000 (160 g, 0.08 mole), EPON® 828 (60 g, 0.16 mole) and acetone (60 g). The mixture was heated to 50°–60° C. for 2 hours. A sample of ca. 19 g was taken for analysis. Then JEFFAMINE® EDR-148 (22 g, 0.149 mole) in acetone (20 g) was added. The reaction temperature was raised to remove acetone to the point of dryness. The resulting material was a milky-white solid. The total amine analysis showed 1.85 meq/g. After standing at room temperature, the product formed two layers of liquid (brown, about 5 wt %, top layer) and solid (soft, milky-white, about 95 wt %, bottom layer), indicating the mixture was not homogeneous.

EXAMPLE 23

Products from D-400-EPON® 828-EDR-148 (1:2:2 molar ratio)

To a 500 ml three-necked flask equipped with a thermometer, Dean-Stark trap, mechanical stirrer and nitrogen inlet line was charged JEFFAMINE® D-400 (60 g, 0.15 mole) in acetone (30 g) and EPON® 828 (112 g, 0.30 moles) in acetone (100 g). The mixture was heated to 70°–80° C. for 1 hour. Then JEFFAMINE® EDR-148 (44.4 g, 0.30 moles) in acetone (40 g) was added and heating continued at 70°–80° C. A gel material was obtained after acetone was removed. This experiment demonstrated the importance of the molar ratio of D-400-EPON® 828-EDR-148.

EXAMPLE 24

Products from D-2000 and EPON® 828 (1:4.5 molar ratio)

To a 1 liter, three-necked flask equipped with a thermometer, stirrer, Dean-Stark trap and nitrogen line was charged D-2000 (200 g, 0.1 mole) and EPON® 828 (168 g, 0.45 mole) and acetone (100 ml). The mixture was heated to reflux to remove acetone and then to 120° C. for over 2 hours. A transparent liquid product was obtained. The analyses indicated the amine content was 0.53 meq/g, total acetylatables 4.11 meq/g, and viscosity 14,000 cs/25° C.

EXAMPLE 25

Products from D-2000-EPON® 828-EDR-148 (1:4.5:6.75 molar ratio)

To a 1 liter, three-necked flask equipped with a thermometer, stirrer, Dean-Stark trap and nitrogen line was charged product from Example 22 ca. 184 g and EDR-148 (50 g, 0.338 mole) in acetone (50 ml). The mixture was heated to remove acetone. During the process, the gel formation was obtained.

EXAMPLE 26

Usage of Sample

The mixture of Example 4 (a T-403/EPON® 828 2:1 adduct, 10 g) and EPONEX® 151 (Shell, 17.6 g) was mixed well and poured into a mold and cured at 85° C. for overnight. A transparent, thermoplastic-like (hard at room temperature, flexible at high temperature) material was made.

EXAMPLE 2

Comparative

A mixture of T-403 (7.1 g), EPON® 828 (2.9 g) and EPONEX® 151 (17.6 g) was mixed well and cured at 85° C. overnight. The cured material was less flexible than the material of Example 26.

What is claimed is:

1. A hydroxypolyamine useful as an epoxy curing agent having the formula:

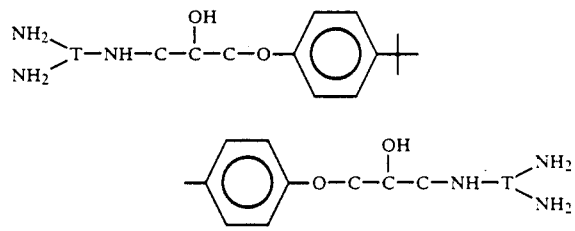

which is the reaction product of a polyoxypropylene triamine and an epoxy component of the formula:

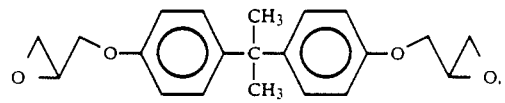

wherein T is derived from a polyoxypropylene triamine of the formula:

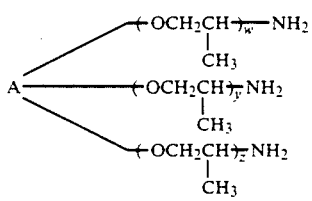

wherein A represents the nucleus of an oxyalkylation susceptible trihydric alcohol containing about 3 to about 6 carbon atoms, w, y and z are numbers and the average value of the sum of w+y+z is from about 4 to about 100.

2. The composition of claim 1 wherein A represents a trimethylol propane nucleus and the triamine has an average molecular weight of about 400.

3. The composition of claim 1 wherein A represents a trimethylol propane nucleus and the triamine has an average molecular weight of about 3000.

4. The composition of claim 1 having an average molecular weight of about 5000 wherein A represents a glycerol nucleus and the triamine contains about 85 moles of propylene oxide.

5. A method for producing novel hexamine epoxy curing agents which comprises:
reacting an excess of polyoxypropylene triamine with an epoxide comprising a diglycidyl ether of Bisphenol A in the presence of acetone at a temperature of about 80°–180° C.

6. A two-step method for producing an active amine terminated high molecular weight derivative of Bisphenol A diglycidyl which comprises reacting a polyoxypropylene diamine with diglycidyl ether of Bisphenol A in a molar ratio of amine to epoxide greater than 4 to form an intermediate product and subsequently reacting the intermediate with an amine terminated polyoxyalkylene glycol in the presence of acetone.

7. A composition of matter useful as an epoxy curing agent in cases needing flexibility comprising a high molecular weight active amine terminated derivative having the formula:

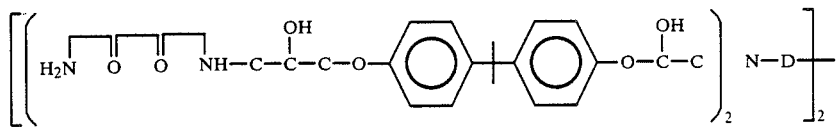

which is the reaction product of an amine terminated alkylene glycol and an epoxy prepolymer component of the formula:

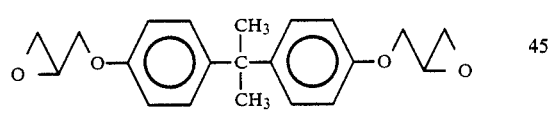

wherein D represents an amine terminated alkylene glycol from the group consisting of amine terminated triethylene glycol and amine terminated tetraethylene glycol.

8. A hydroxypolyamine useful as an epoxy curing agent having the formula:

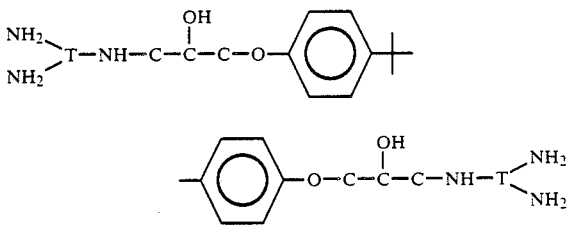

which is the reaction product of a polyoxypropylene triamine of the formula:

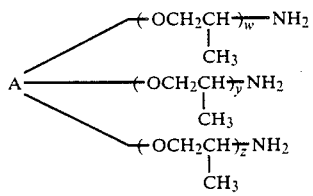

wherein A represents the nucleus of an oxyalkylation susceptible trihydric alcohol containing about 3 to about 6 carbon atoms, w, y and z are numbers and the average value of the sum of w+y+z is from about 4 to about 100 and an epoxy component of the formula:

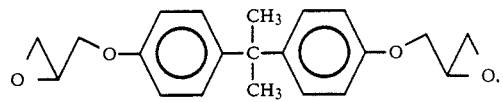

wherein T is the reaction product residue of the polyoxypropylene triamine defined above.

* * * * *